(12) United States Patent
Farooq et al.

(10) Patent No.: US 11,541,836 B1
(45) Date of Patent: Jan. 3, 2023

(54) INFLATABLE DEVICES BETWEEN VEHICLE SEAT AND VEHICLE DOORS

(71) Applicant: Ford Global Technologies, LLC, Dearborn, MI (US)

(72) Inventors: S. M. Iskander Farooq, Novi, MI (US); Dean M. Jaradi, Macomb, MI (US); Brian Robert Spahn, Plymouth, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/398,351

(22) Filed: Aug. 10, 2021

(51) Int. Cl.
*B60R 21/207* (2006.01)
*B60R 21/231* (2011.01)

(52) U.S. Cl.
CPC .......... *B60R 21/207* (2013.01); *B60R 21/231* (2013.01); *B60R 2021/2078* (2013.01); *B60R 2021/23107* (2013.01); *B60R 2021/23146* (2013.01); *B60R 2021/23153* (2013.01); *B60R 2021/23161* (2013.01)

(58) Field of Classification Search
None
See application file for complete search history.

(56) References Cited

U.S. PATENT DOCUMENTS

| | | | |
|---|---|---|---|
| 7,673,937 B2 | 3/2010 | Core Almarza et al. | |
| 9,126,510 B2 | 9/2015 | Hirako | |
| 9,889,815 B2 | 2/2018 | Morozini de Lira | |
| 10,023,146 B2 * | 7/2018 | Faruque | B60R 21/237 |
| 10,035,438 B2 * | 7/2018 | McCoy | B60N 2/62 |
| 2006/0138757 A1 | 6/2006 | Riedel et al. | |
| 2006/0202452 A1 * | 9/2006 | Breed | B60R 21/264 280/730.2 |
| 2017/0158096 A1 | 6/2017 | Whitens et al. | |

FOREIGN PATENT DOCUMENTS

| | | | |
|---|---|---|---|
| CN | 111267769 A | | 6/2020 |
| JP | 2021017148 A | * | 2/2021 |
| KR | 20060053704 A | | 5/2006 |
| KR | 20090010799 A | | 1/2009 |

* cited by examiner

*Primary Examiner* — Faye M Fleming
(74) *Attorney, Agent, or Firm* — Frank A. MacKenzie; Bejin Bieneman PLC (57) ABSTRACT

An assembly for a vehicle includes a vehicle floor. The assembly includes a pair of vehicle doors spaced cross-vehicle from each other. The vehicle floor is between the vehicle doors. The assembly includes a vehicle seat between the vehicle doors and having a seat bottom supported by the vehicle floor. The assembly includes a pair of inflatable devices that are thermoplastic elastomer and inflatable to inflated positions. The pair of inflatable devices are supported by the vehicle floor and spaced from each other. One of the inflatable devices is between the seat bottom and one of the vehicle doors in the inflated position and the other of the inflatable devices is between the seat bottom and the other of the vehicle doors in the inflated position. The seat bottom is elongated from one of the inflatable devices to the other of the inflatable devices.

20 Claims, 5 Drawing Sheets

INFLATABLE DEVICES BETWEEN VEHICLE SEAT AND VEHICLE DOORS

BACKGROUND

A vehicle may include one or more inflatable devices, inflatable during vehicle impacts to control the kinematics and absorb energy of occupants of the vehicle during an impact. The inflatable device may be a thermoplastic elastomer. The vehicle may include an inflator in fluid communication with the inflatable device for inflating the inflatable device from an uninflated position to an inflated position.

DETAILED DESCRIPTION

An assembly including a vehicle floor. The assembly includes a pair of vehicle doors spaced cross-vehicle from each other with the vehicle floor being between the vehicle doors. The assembly includes a vehicle seat between the vehicle doors and having a seat bottom supported by the vehicle floor. The assembly includes a pair of inflatable devices being thermoplastic elastomer and inflatable to inflated positions, the pair of inflatable devices being supported by the vehicle floor and spaced from each other, one of the inflatable devices being between the seat bottom and one of the vehicle doors in the inflated positions and the other of the inflatable devices being between the seat bottom and the other of the vehicle doors in the inflated positions with the seat bottom being elongated from one of the inflatable devices to the other of the inflatable devices.

Each of the inflatable devices may be between the vehicle floor and the seat bottom in an uninflated position.

The inflatable devices may be elongated in a vehicle-longitudinal direction in the inflated positions.

The seat bottom may define a plurality of occupant seating areas between the inflatable devices.

The assembly may include a third inflatable device that is a thermoplastic elastomer and inflatable to an inflated position, the seat bottom being elongated along a seat-longitudinal axis and the third inflatable device being elongated along the seat-longitudinal axis in the inflated position.

The third inflatable device may be vehicle-forward of the seat bottom in the inflated position.

The seat bottom may have a first outboard end at one vehicle door with one of the pair of inflatable devices at the first outboard end, a second outboard end at the other vehicle door with the other of the pair of inflatable devices at the second outboard end, and a front edge extending from one outboard end to the other outboard end, the third inflatable device when in the inflated position extending along the front edge between the first outboard end and the second outboard end of the seat bottom.

The pair of inflatable devices may be each elongated in a vehicle-longitudinal direction.

The seat bottom may define an occupant pelvic area adjacent each of the inflatable devices, the inflatable devices being between the vehicle doors and the occupant pelvic area in the inflated positions.

The inflatable devices may be inflatable upwardly from the vehicle floor toward the inflated positions.

The inflatable devices may abut the seat bottom in the inflated positions.

The inflatable devices may be vehicle-outboard of the seat bottom.

The inflatable devices may abut the vehicle doors adjacent the inflatable devices, respectively.

The assembly may include a third inflatable device that is a thermoplastic elastomer, the third inflatable device being spaced from and inflatable to an inflated position between the inflatable devices.

The seat bottom may be movable upwardly from the vehicle floor by the third inflatable device as the third inflatable device moves to the inflated position.

The third inflatable device may be between the seat bottom and the vehicle floor.

The pair of inflatable devices may be vehicle-outboard of the third inflatable device.

The inflatable devices may be adhered to the vehicle floor.

The assembly may include an inflator fluidly connected to both of the inflatable devices.

With reference to the Figures, wherein like numerals indicate like parts throughout the several views, an assembly 10 for a vehicle 12 includes a vehicle floor 14. The assembly 10 includes a pair of vehicle doors 16 spaced cross-vehicle from each other. The vehicle floor 14 is between the vehicle doors 16. The assembly 10 includes a vehicle seat 18 between the vehicle doors 16 and having a seat bottom 20 supported by the vehicle floor 14. The assembly 10 includes a pair of inflatable devices 22 that are thermoplastic elastomer and inflatable to inflated positions. The pair of inflatable devices 22 are supported by the vehicle floor 14 and spaced from each other. One of the pair of inflatable devices 22 is between the seat bottom 20 and one of the doors 16 in the inflated position and the other of the pair of inflatable devices 22 is between the seat bottom 20 and the other of the doors 16 in the inflated position. The seat bottom 20 is elongated from one of the pair of inflatable devices 22 to the other of the pair of inflatable devices 22.

In the event of an impact to the vehicle 12, e.g., a side impact, the pair of inflatable devices 22 are deployed away from the vehicle floor 14 from an uninflated position to an inflated position. The pair of inflatable devices 22 may control the kinematics of an occupant during the impact on either end of the seat bottom 20 adjacent the pelvis of the occupant. The pair of inflatable devices 22 are a thermoplastic elastomer (TPE). The thermoplastic elastomer has both thermoplastic and elastomeric properties. The thermoplastic elastomer of the inflatable device has properties allow the pair of inflatable devices 22 to control the kinematics of an occupant and absorb energy from the impact to the vehicle 12. The pair of inflatable devices 22 being a thermoplastic elastomer aids in the deployment characteristics and the shape and size of the pair of inflatable devices 22 in the inflated position. The thermoplastic elastomer may aid in packaging of the pair of inflatable devices 22. As described further below, the properties of the thermoplastic elastomeric of the pair of inflatable devices 22 allow the pair of inflatable devices 22 to be packaged between the seat bottom 20 and the vehicle doors 16 and provide control of the shape, size, and dimensions during inflation to position the pair of inflatable devices 22 to absorb energy from an occupant in the event of an impact to the vehicle 12.

Figure 1:
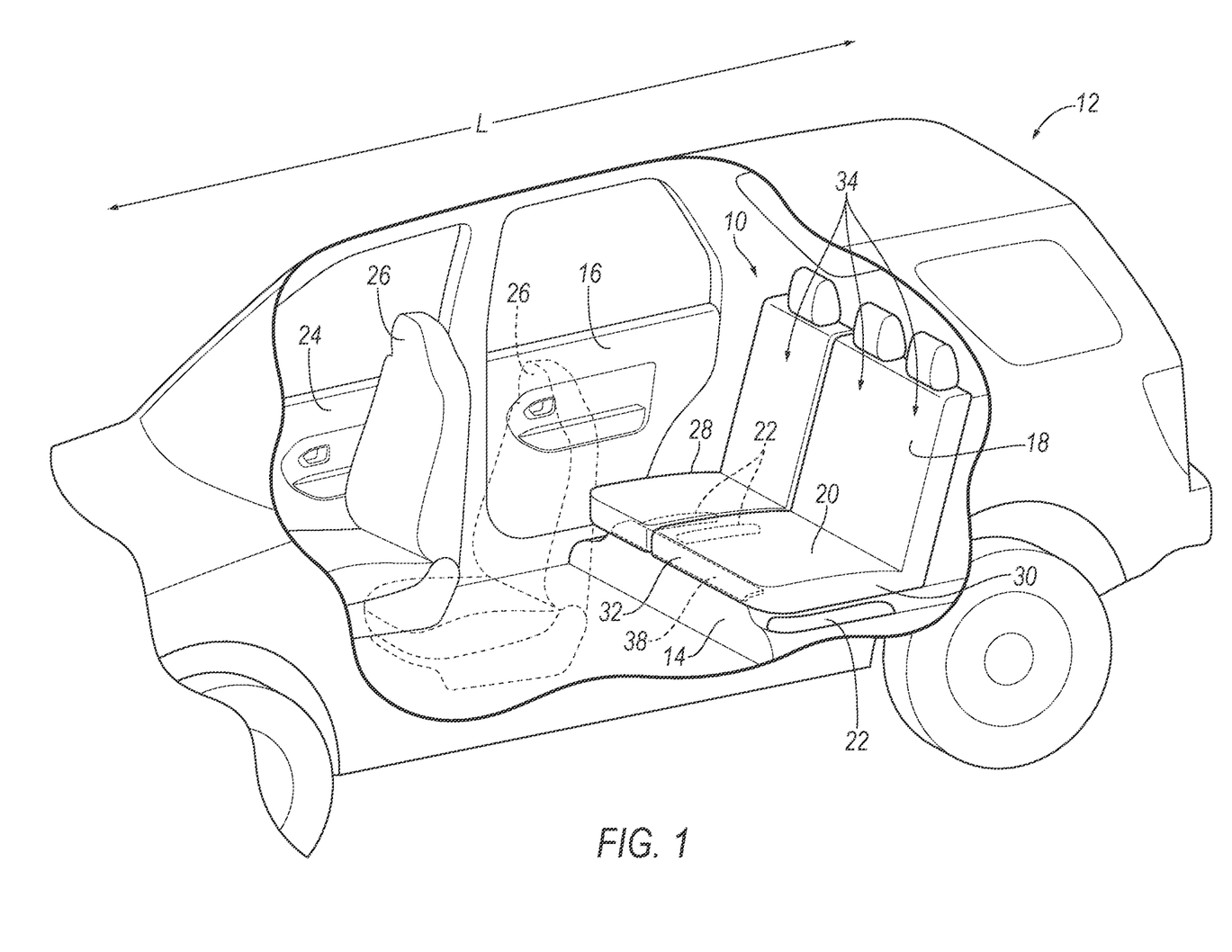
FIG. 1 is a perspective view of a vehicle having a vehicle floor, a rear seat, and three inflatable devices in an uninflated position and supported by the vehicle floor.
Figure 2:
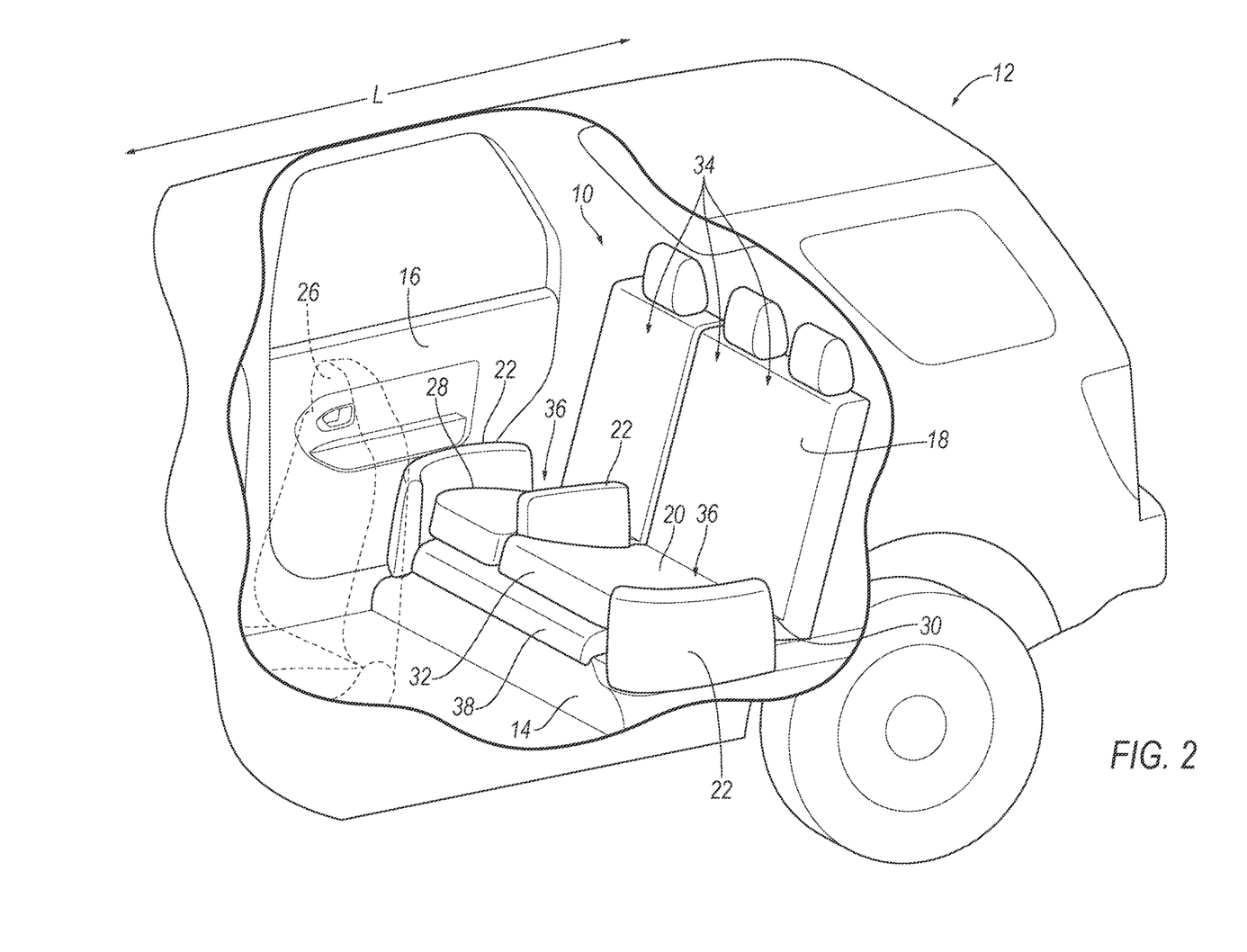
FIG. 2 is a perspective view of the vehicle with the inflatable devices in an inflated position.
Figure 3:
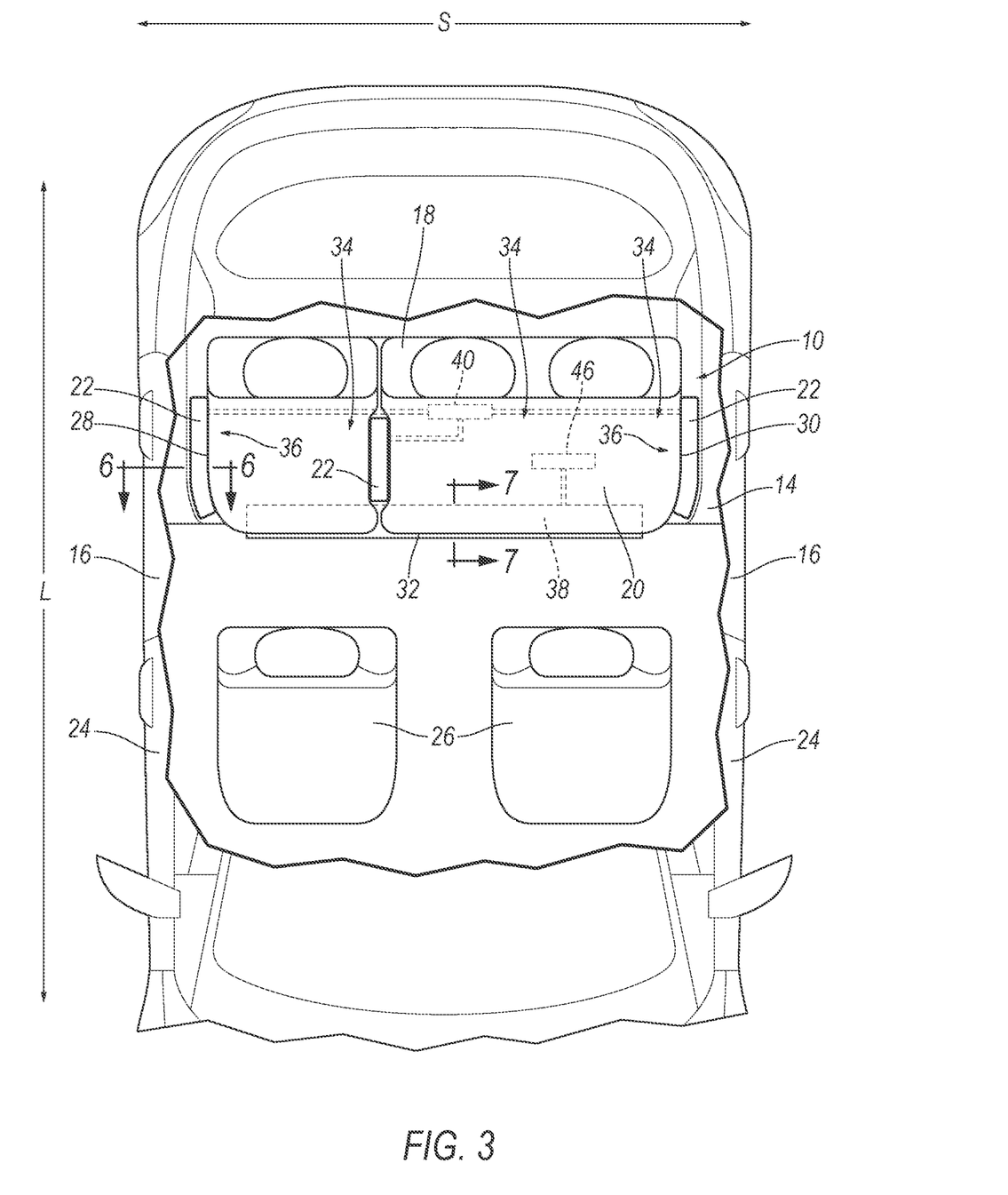
FIG. 3 is a plan view of the vehicle with the rear seat and three inflatable devices.
Figure 4:
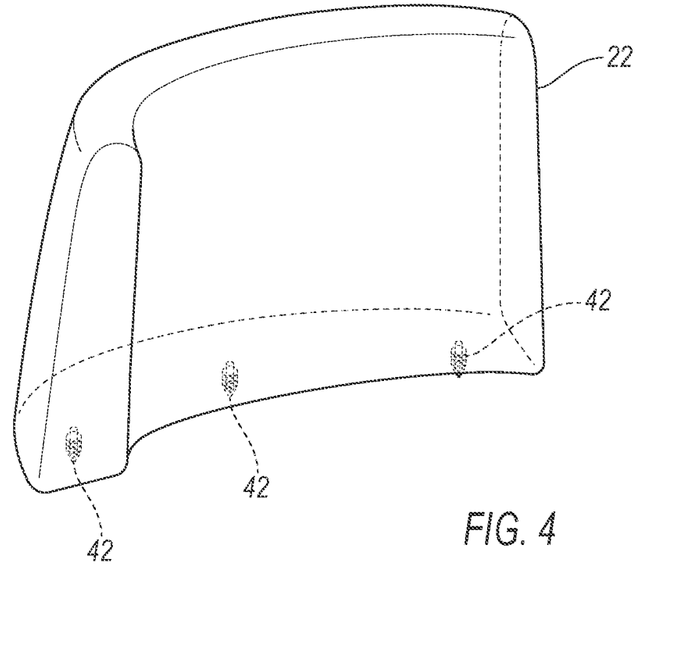
FIG. 4 is a perspective view of one of the inflatable devices adjacent a door of the vehicle.
Figure 5:
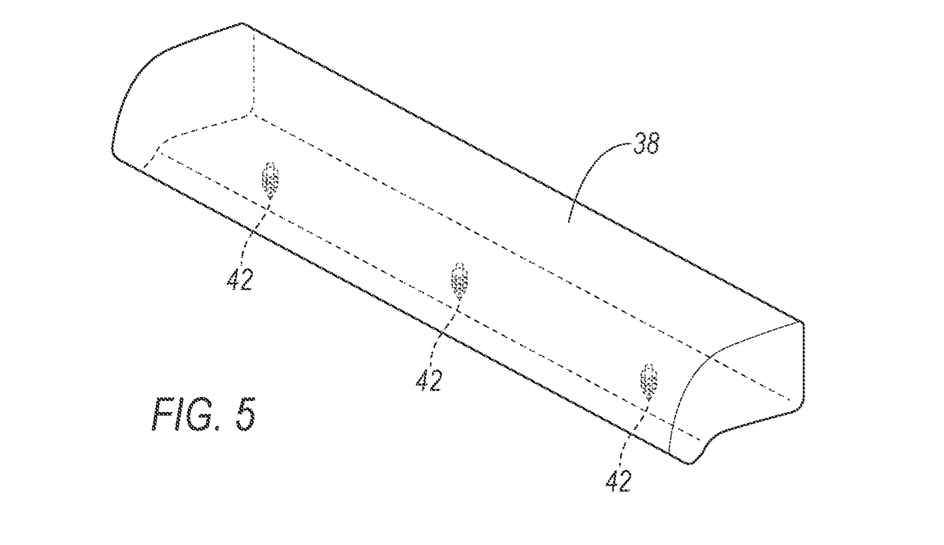
FIG. 5 is a perspective view of one of the inflatable devices extending cross-vehicle along the rear seat.

With reference to FIGS. 1-3, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails, pillars, body panels, vehicle floor 14, vehicle roof, etc.

The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle 12 includes a plurality of doors 16, 24 openable for vehicle 12 occupants to enter and exit a passenger compartment. The vehicle 12 includes a pair of front doors 24 spaced cross-vehicle from each other and a pair of rear doors 16 spaced cross-vehicle from each other. The front doors 24 may be adjacent the front end of the passenger compartment and the rear doors 16 may be adjacent the rear end of the passenger compartment.

The roof rails contact a top edge of the doors 16, 24 when the doors 16, 24 are closed. Each door includes at least one door panel (not numbered) and the door-trim panel supported on the door panel. Specifically, the door may include two panels, namely a door inner (not numbered) and a door outer (not numbered). In such an example, the door-trim panel and the door outer are fixed to the door inner. The door-trim panel is positioned opposite the door outer relative to the door frame. The door-trim panel is inboard relative to the door inner, and the door outer is outboard relative to the door inner. The door includes a window opening that may be completely closed by a window of the window is in a fully raised position. The window opening is defined by the door-trim panel and door outer on a bottom edge and either by the door inner circumscribing the window opening or by the body, e.g., the A pillar, the B pillar, and the roof rail. The door outer faces outboard relative to the vehicle 12.

The door outer may define a portion of the exterior of the vehicle 12. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.).

The door inner may be metal (such as steel, aluminum, etc.) or polymeric (such as fiber reinforced plastic composite, etc.). The door inner provides structural rigidity for the door outer. The door inner may provide a mounting location for components of the door.

The door-trim panel may include a covering supported by the top roll. The covering may include upholstery, padding, etc. The upholstery may be cloth, leather, faux leather, or any other suitable material. The upholstery may be stitched in panels around the top roll. The padding may be between the covering and the top roll and may be foam or any other suitable material. The door-trim panel may be a material suitable for an interior of the vehicle 12, such as vinyl, plastic, leather, wood, etc.

The door-trim panel may be a material suitable for an interior of the vehicle 12, such as vinyl, plastic, leather, wood, etc.

As referenced above, the body includes the vehicle floor 14. The vehicle floor 14 is spaced downwardly from the vehicle roof. The vehicle floor 14 may define the lower boundary of the passenger compartment and may extend from the front end of the passenger compartment to the rear end of the passenger compartment and from one side of the vehicle 12 to the other side of the vehicle 12, i.e., between the pair of front doors 24 and the pair of rear doors 16. The vehicle floor 14 may include a floor panel (not numbered) and upholstery (not numbered) on the vehicle floor 14. The upholstery may be, for example, carpet, and may have a class-A surface facing the passenger compartment, i.e., a surface specifically manufactured to have a high quality, finished, aesthetic appearance free of blemishes. The vehicle floor 14 may include cross-beams (not shown) connected to the floor panel and to other components of the body.

With continued reference to FIGS. 1-3, the vehicle 12 may include one or more seats 18, 26. Specifically, the vehicle 12 may include any suitable number of seats 18, 26. The seats 18, 26 are supported by the vehicle floor 14. The seats 18, 26 may be arranged in any suitable arrangement in the passenger compartment. As in the example shown in the Figures, one or more of the seats 18, 26 may be at the front end of the passenger compartment, e.g., front seats 26. In other examples, one or more of the seats 18, 26 may be behind the front end of the passenger compartment, e.g., a rear seat 18 at the rear end of the passenger compartment. The seats 18, 26 may be movable relative to the vehicle floor 14 to various positions, e.g., movable fore-and-aft and/or cross-vehicle.

The seats 18, 26, i.e., the front seats 26 and the rear seat 18, include a seatback (not numbered), a seat bottom 20, and a head restraint (not numbered). The head restraint may be supported by and extending upwardly from the seatback. The head restraint may be stationary or movable relative to the seatback. The seat bottom 20 is supported by the vehicle floor 14 and the seatback may be supported by the seat bottom 20. Specifically, the seat bottom 20 may be connected to the vehicle floor 14. The seat bottom 20 and the vehicle floor 14 may each include connectors that are connectable with each other to secure the seat bottom 20 to the vehicle floor 14, e.g., hooks, latches, etc. The seatback extends upwardly from the seat bottom 20 and may be stationary or movable relative to the seat bottom 20. The seatback, the seat bottom 20, and the head restraint may be adjustable in multiple degrees of freedom. Specifically, the seatback, the seat bottom 20, and the head restraint may themselves be adjustable. In other words, adjustable components within the seatback, the seat bottom 20, and the head restraint may be adjustable relative to each other.

The seats 18, 26 may each be adjacent the doors 16, 24 of the vehicle 12. For example, each of the front seats 26 and each of the rear seats 18 may be adjacent a door 16, 24 of the vehicle 12. Specifically, as shown in the Figures, each front seat 26 may be adjacent a front door 24 and the rear seat 18 may be adjacent the rear doors 16. In other words, the front seats 26 are between the front doors 24 and the rear seat 18 is between the rear doors 16. The doors 16, 24 are vehicle-outboard from each of the front seats 26 and the rear seat 18, i.e., the front doors 24 are vehicle-outboard from the front seats 26 and the rear doors 16 are vehicle-outboard of the rear seat 18.

The seat bottom 20 of the rear seat 18 is elongated along a seat-longitudinal axis S. The seat-longitudinal axis S extends in a cross-vehicle direction from one of the rear doors 16 to the other of the rear doors 16. Specifically, the seat bottom 20 is elongated from a first outboard end 28 to a second outboard end 30. The first outboard end 28 is at one of the rear doors 16 and the second outboard end 30 at the other of the rear doors 16. The seat bottom 20 includes a front edge 32 extending from the first outboard end 28 to the second outboard end 30. The front edge 32 of the seat bottom 20 may be spaced vehicle-forward from the seatback of the rear seat 18.

The seats 18, 26, e.g., the seat bottom 20, may include a seat frame (not shown) and a covering (not numbered) supported on the seat frame. The seat frame may be supported by the vehicle floor 14. As discussed above, the seat bottom 20, specifically, the seat frame of the seat bottom 20, and the vehicle floor 14 may each include connectors that are connectable with each other to secure the seat bottom 20 to the vehicle floor 14, e.g., hooks, latches, etc. The seat frame may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

The seats 18, 26 may be of any suitable type. As an example the front seats 26 may be bucket seats. In some examples, such as shown in the Figures, the rear seat 18 may be a bench seat. The rear seat 18 may be split to include multiple portions e.g., a 60/40 split as shown in the Figures in which one portion is 60% of the length of the rear seat 18 and the other portion is 40% of the length of the rear seat 18. In other words, the seat bottom 20 of the rear seat 18 may include multiple portions adjacent each other cross-vehicle with the entire rear seat 18 extending from one side of the passenger compartment to the other side of the passenger compartment. In such an example as is shown in the Figures, the seat bottom 20 may include two portions adjacent each other. In other examples, the rear seat 18 may include a single portion extending from one side of the passenger compartment to the other side of the passenger compartment. The seat bottom 20 of the rear seat 18 may include any suitable number of portions, e.g., more than two portions. A single occupant may be properly seated in the front seats 26 and multiple occupants may be properly seated in the rear seat 18. In the example shown in the Figures, three occupants may be properly seated along the rear seat 18 with two of the occupants being vehicle-outboard occupants and one of the occupants being between the vehicle-outboard occupants, i.e., a middle occupant. In other examples, the rear seat 18 may be any other suitable type of seat, e.g., a bucket seat.

With continued reference to FIGS. 1-3, the rear seat 18, specifically, the seat bottom 20 of the rear seat 18, defines an occupant seating area 34 of the seat. Specifically, the rear seat 18 may define multiple occupant seating areas 34 spaced cross-vehicle from each other. As shown in the Figures, the rear seat 18 defines three occupant seating areas 34 along the seat bottom 20. The occupant seating area 34 is the area occupied by an occupant when properly seated on the seat bottom 20 and the seat back. The occupant seating area 34 is in a seat-forward direction of the seatback and above the seat bottom 20. In the example shown in the Figures, the occupant seating area 34 of the rear seat 18 faces the front end of the passenger compartment.

The rear seat 18 defines an occupant pelvic area 36. The occupant pelvic area 36 is the volume typically occupied by the pelvis of an occupant properly seated in one of the occupant seating areas 34 adjacent one of the rear doors 16 of the vehicle 12. Each of the occupant seating areas 34 may define an occupant pelvic area 36 of the occupant properly seated in the occupant seating area 34.

With reference to FIGS. 1-4, and 6, the assembly 10 includes a plurality of inflatable devices 22. The inflatable devices 22 are a thermoplastic elastomer (TPE) and are inflatable from the uninflated position to the inflated position. Specifically, the inflatable devices 22 have sides that are thermoplastic elastomer. The sides of the inflatable devices 22 define an inflation chamber. The wall thickness of the inflatable device 22 may be, for example, 1-3 mm.

The inflatable devices 22 may be of any suitable TPE, e.g., styrenic block copolymers, thermoplastic olefins, elastomeric alloys, thermoplastic polyurethanes, thermoplastic copolyesters, and thermoplastic polyamides. The inflatable devices 22 may be formed using any suitable manufacturing process, e.g., injection molding, blow molding, ultrasonic welding, etc. Specifically, the sides of the inflatable devices 22 may be manufactured to be unitary. Unitary means a single, uniform piece of material with no seams, joints, fasteners, or adhesives holding it together, i.e., formed together simultaneously as a single continuous unit. Specifically, the sides of the inflatable devices 22 are solid, i.e., not woven, fabric, sewn, etc. Non-unitary components, in contrast, are formed separately and subsequently assembled, e.g., by threaded engagement, welding, etc.

A TPE may be manufactured with a class-A surface, e.g., the TPE may be textured in the molding process to match another class-A surface in the vehicle 12. In other words, when the inflatable devices 22 are a TPE, the inflatable devices 22 may be integrated into vehicle components without an additional covering. For example, the inflatable devices 22 may be integrated into trim along the vehicle floor 14 or other vehicle components. The properties of the thermoplastic elastomer aids in inflation characteristics and the shape, size, and dimensions of the inflatable devices 22 in the inflated position may be controlled by the manufacturing of the thermoplastic elastomer to allow for specific deployment of the inflatable devices 22 between the rear seat 18 and the rear doors 16.

The inflatable devices 22 are supported by the vehicle floor 14. Specifically, each of the inflatable devices 22 are between the vehicle floor 14 and the seat bottom 20 when in the uninflated position. In other words, the inflatable devices 22 are supported by the vehicle floor 14 below the seat bottom 20 when the inflatable devices 22 are in the uninflated position. As the inflatable devices 22 moves to the inflated position, the inflatable devices 22 move upwardly away from the vehicle floor 14, i.e., the inflatable devices 22 are inflatable upwardly from the vehicle floor 14 toward the inflated position.

With continued reference to FIGS. 1-4, and 6, the inflatable devices 22 are spaced cross-vehicle from each other along the vehicle floor 14. The seat bottom 20 is elongated between the inflatable devices 22. Specifically, the assembly 10 may include an inflatable device 22 at the first outboard end 28 of the seat bottom 20, an inflatable device 22 at the second outboard end 30 of the seat bottom 20, and in examples having a seat bottom 20 including multiple portions, an inflatable device 22 between the multiple portions of the seat bottom 20. In examples where the seat bottom 20 includes a single portion, the assembly 10 may only include an inflatable device 22 at the first outboard end 28 of the seat bottom 20 and an inflatable device 22 at the second outboard end 30 of the seat bottom 20. In examples having multiple portions of the seat bottom 20, the inflatable device 22 between the multiple portions of the seat bottom 20 may be between the inflatable devices 22 at the first outboard end 28 and the second outboard end 30. The seat bottom 20 of the rear seat 18 is between the inflatable devices 22. The occupant seating areas 34 of the rear seat 18 are between the inflatable devices 22. In other words, at least two of the inflatable devices 22 are vehicle-outboard of the seat bottom 20 and, in examples including a seat bottom 20 having multiple portions, an inflatable device 22 may be between the multiple portions of the seat bottom 20 and the inflatable devices vehicle-outboard of the seat bottom 20. In examples including multiple portions of the seat bottom 20, the inflatable device 22 between the multiple portions of the seat bottom 20 may be between the occupant seating area of one of the vehicle-outboard occupants and the middle occupant.

The inflatable devices 22 are elongated in a vehicle-longitudinal direction L. Specifically, the inflatable devices 22 are elongated in the vehicle-longitudinal direction L when in the inflated position. The inflatable devices 22 are both elongated in the vehicle-longitudinal direction L along the first outboard end 28 and the second outboard end 30 of the seat bottom 20.

One or more of the inflatable devices 22 are between the seat bottom 20 and the rear doors 16. Specifically, the assembly 10 includes an inflatable device 22 between the seat bottom 20 and each of the rear doors 16. The inflatable devices 22 inflate to the inflated position adjacent the seat bottom 20 of the rear seat 18 and the rear doors 16. Specifically, the inflatable devices 22 inflates between the rear seat 18 and the rear doors 16. In other words, one of the inflatable devices 22 is between one of the doors 16 and the first outboard end 28 of the seat bottom 20 and the other of the inflatable devices 22 is between another of the doors 16 and the second outboard end 30 of the seat bottom 20. The inflatable devices 22 being between the seat bottom 20 and the rear doors 16 allows the inflatable devices 22 to control the kinematics of the vehicle-outboard occupants seated adjacent the rear doors 16. The properties of the inflatable devices 22, i.e., the thermoplastic elastomer, provides control of the size and shape to fit the inflatable devices between the rear seat 18 and the rear doors 16 in the inflated position. In other words, the architecture and design of the vehicle 12 may dictate the shape, size, and dimensions of the inflatable devices 22 between the rear seat 18 and the rear doors 16.

With continued reference to FIGS. 1-4, and 6, each of the inflatable devices 22 may be adjacent the occupant seating area 34 of the vehicle-outboard occupants seated in the rear seat 18. Specifically, the inflatable devices 22 may be adjacent the occupant pelvic areas 36 of the vehicle-outboard occupants of the rear seat 18. One of the inflatable devices 22 may be between one of the rear doors 16 and one of the occupant pelvic areas 36 defined by the rear seat 18 and the other of the inflatable devices 22 may be between the other of the rear doors 16 and the other of the occupant pelvic areas 36 defined by the rear seat 18. Specifically, the inflatable devices 22 are sized and shaped to extend between the rear doors 16 and the occupant pelvic areas 36 of the rear seat 18, i.e., the area occupied by the pelvis of the occupant in the seat. The inflatable devices 22 control the kinematics of an occupant seated in the seat of the vehicle 12, i.e., an occupant occupying the occupant pelvic area 36 defined by the rear seat 18 and absorb energy from an impact to the vehicle 12.

As the inflatable devices 22 move toward the inflated position, the inflatable devices 22 inflate upwardly from the vehicle floor 14 and between the seat bottom 20 of the rear seat 18 and the doors 16, 24. In the inflated positions, the inflatable devices 22 may abut the seat bottom 20 and the door adjacent each of the inflatable devices 22. Specifically, the inflatable devices 22 may abut the seat bottom 20 at the first outboard end 28 and at the second outboard end 30.

With reference to FIGS. 1-3, 5, and 7, the assembly 10 may include a fourth inflatable device 38 that is a thermoplastic elastomer. The fourth inflatable device 38 may be of the same type of thermoplastic elastomer as that described above for the inflatable devices 22. As an example, the inflatable devices 22 and the fourth inflatable device 38 may be the same type of thermoplastic elastomer. In the event of an impact to the vehicle 12, the fourth inflatable device 38 is inflatable from an uninflated position to an inflated position. In some examples, such as shown in the Figures, the fourth inflatable device 38 may move to the inflated position simultaneously with the inflatable devices 22, i.e., the fourth inflatable device 38 may be in the inflated position when the inflatable devices 22 is in the inflated position.

The fourth inflatable device 38 is between the seat bottom 20 of the rear seat 18 and the vehicle floor 14 when in the uninflated position. The fourth inflatable device 38 is between the inflatable devices 22 in a cross-vehicle direction. The fourth inflatable device 38 is spaced cross-vehicle from the inflatable devices 22. Specifically, the inflatable devices 22 are inflatable vehicle-outboard of the fourth inflatable device 38.

As shown in FIGS. 1-3, 5, and 7, the fourth inflatable device 38 is vehicle-forward of the seat bottom 20 in the inflated position. Specifically, the fourth inflatable device 38 is elongated along the seat-longitudinal axis S in the inflated position. The fourth inflatable device 38 is elongated in the cross-vehicle direction. The fourth inflatable device 38 extends along the front edge 32 of the seat bottom 20 of the rear seat 18. The fourth inflatable device 38 is elongated between the first outboard end 28 and the second outboard end 30.

With continued reference to FIGS. 1-3, the fourth inflatable device 38 inflates away from the vehicle floor 14 to the inflated position. The seat bottom 20 is movable upwardly from the vehicle floor 14 by the fourth inflatable device 38 as the fourth inflatable device 38 moves to the inflated position. Specifically, the fourth inflatable device 38 abuts the seat bottom 20 of the rear seat 18 and moves the seat bottom 20 upwardly from the vehicle floor 14 as the fourth inflatable device 38 moves to the inflated position. The properties of the thermoplastic elastomer allow control of the size, shape, and dimensions in the inflated position. The movement of the seat bottom 20 moves the knees of an occupant in one of the occupant seating areas 34 upward to limit vehicle-forward movement of the occupant in the event of an impact to the vehicle 12.

In other examples, examples not shown in the Figures, the fourth inflatable device 38 may extend in a vehicle-longitudinal direction L, like the inflatable devices 22. Such an example may be the seat bottom 20 of the rear seat 18 including multiple sections. The fourth inflatable device 38 may be positioned between the multiple sections of the seat bottom 20 of the rear seat 18 and be inflatable between the multiple sections of the seat bottom 20. The fourth inflatable device 38, in such an example, controls the kinematics of occupants of the rear seat 18 additionally to the inflatable devices 22.

The assembly 10 includes an inflator 40 fluidly connected to the inflatable devices 22. The inflator 40 expands the inflatable devices 22 with inflation medium, such as a gas, to move the inflatable devices 22 from the uninflated position to the inflated position. The assembly 10 may include a second inflator 46 fluidly connected to the fourth inflatable device 38, as shown in FIG. 3. The inflators 40, 46 may be supported by any suitable component. For example, as shown in the Figures, the inflators 40, 46 may be supported by the vehicle floor 14 between the vehicle floor 14 and the seat bottom 20 of the rear seat 18. In such an example, the inflators 40, 46 may be located exterior to the inflatable devices 22, 38 and connected to the inflatable devices 22, 38, e.g., by a fill tube (not numbered). In other examples, the inflators 40, 46 may be disposed in the inflation chamber of the inflatable devices 22, 38. In such examples, the inflatable devices 22, 38 may include a clip (not shown) that may engage the inflators 40, 46. The clip may be, for example, integral with the inflatable devices 22, 38, i.e., simultaneously formed together as a unit. For example, the clip and the inflatable devices 22, 38 may be molded together in a single molding process. The inflators 40, 46 may be, for example, a pyrotechnic inflator 40 that ignites a chemical reaction to generate the inflation medium, a stored gas inflator 40 that releases e.g., by a pyrotechnic valve stored gas as the inflation medium, or a hybrid.

Figure 6:
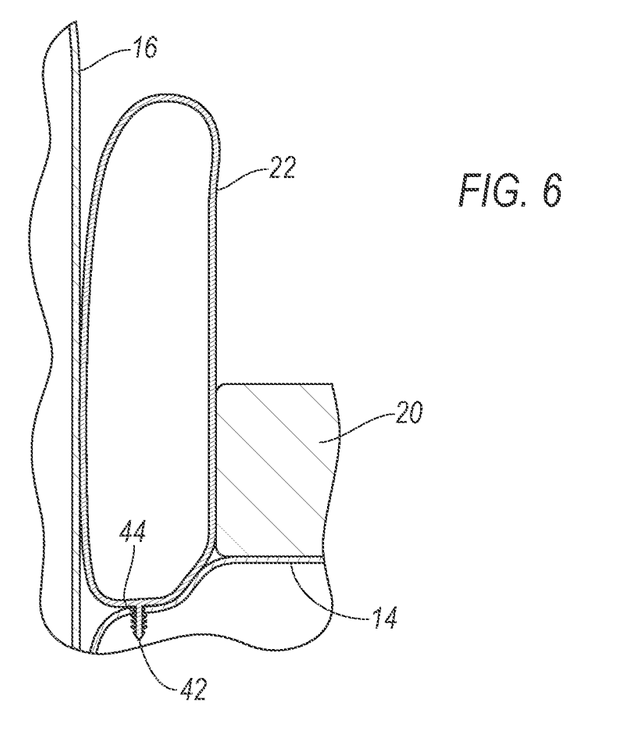
FIG. 6 is a cross-sectional view through line 6 of FIG. 3.
Figure 7:
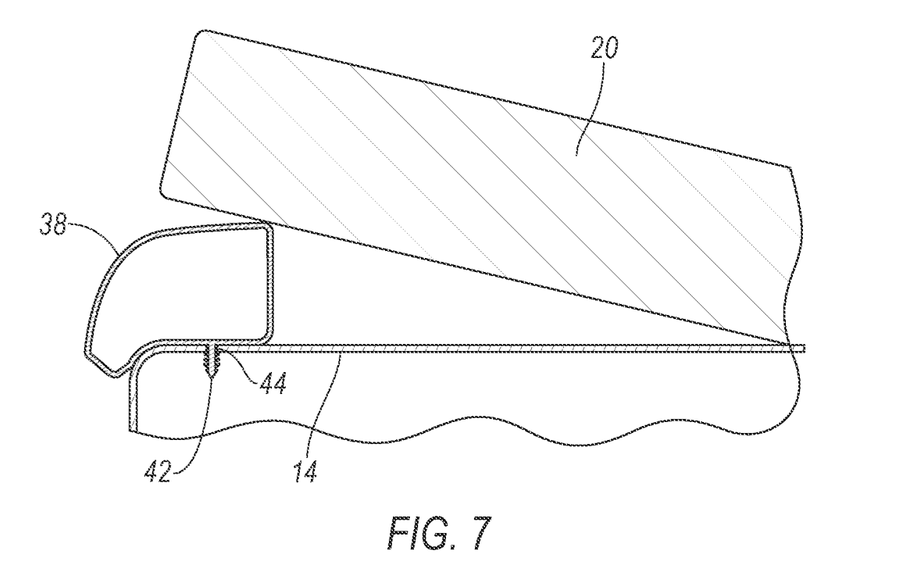
FIG. 7 is a cross-sectional view through line 7 of FIG. 3.

With reference to FIGS. 6 and 7, the inflatable devices 22, 38 may be fixed to the vehicle floor 14. In some examples the inflatable devices 22, 38 may be adhered to the vehicle floor 14. In such examples, the inflatable devices 22, 38 are adhered such that the inflatable devices 22, 38 remain stationary in the event of a vehicle 12 impact and as the inflatable devices 22, 38 move to the inflated position. In other examples, the inflatable devices 22, 38 may be molded into other components of the vehicle 12, e.g., trim panels inside the passenger compartment of the vehicle 12. The inflatable devices 22, 38 may present a class-A surface. i.e., a finished surface exposed to view by a customer and free of unaesthetic blemishes and defects. In further examples, the assembly 10 includes unitary connectors 42 that engage the inflatable devices 22, 38 with the vehicle floor 14. The unitary connectors 42 are unitary with the sides of the inflatable devices 22, 38, i.e., a single, uniform piece of material with no seams, joints, fasteners, or adhesives holding it together. In other words, the unitary connectors 42 are molded into the sides of the inflatable devices 22, 38 simultaneously during the same molding process. As shown in FIGS. 4-7, the unitary connectors 42 may be Christmas tree fasteners engageable with holes 44 in the vehicle floor 14. The unitary connectors 42 may be any suitable type of connector to engage the inflatable devices 22, 38 with the vehicle floor 14, e.g., clips, fasteners, etc. The inflatable devices 22, 38 may be secured to the vehicle floor 14 in any suitable manner such that the inflatable devices 22, 38 remains stationary in the event of an impact to the vehicle 12 and as the inflatable devices 22, 38 move to the inflated positions. Any combination of adhesive and connectors 42 may be used to secure the inflatable devices 22, 38 to the vehicle floor 14.

The numerical adverbs such as "first," "second," "third," or "fourth" with respect to the elements of the present disclosure are used herein merely as identifiers and do not signify order or importance. The terms "first" and "second" may be used interchangeably as shown in the Figures.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
a vehicle floor;
a pair of vehicle doors spaced cross-vehicle from each other, the vehicle floor being between the vehicle doors;
a vehicle seat between the vehicle doors and having a seat bottom supported by the vehicle floor; and
a pair of inflatable devices being thermoplastic elastomer and inflatable to inflated positions, the pair of inflatable devices being fixed to the vehicle floor and spaced from each other, one of the inflatable devices being between the seat bottom and one of the vehicle doors in the inflated positions and the other of the inflatable devices being between the seat bottom and the other of the vehicle doors in the inflated positions, the seat bottom being elongated from one of the inflatable devices to the other of the inflatable devices.

2. The assembly of claim 1, wherein each of the inflatable devices is between the vehicle floor and the seat bottom in an uninflated position.

3. The assembly of claim 1, wherein the inflatable devices are elongated in a vehicle-longitudinal direction in the inflated positions.

4. The assembly of claim 1, wherein the seat bottom defines a plurality of occupant seating areas between the inflatable devices.

5. The assembly of claim 4, further comprising a third inflatable device that is a thermoplastic elastomer and inflatable to an inflated position, the seat bottom being elongated along a seat-longitudinal axis and the third inflatable device being elongated along the seat-longitudinal axis in the inflated position.

6. The assembly of claim 5, wherein the third inflatable device is vehicle-forward of the seat bottom in the inflated position.

7. The assembly of claim 5, wherein the seat bottom has a first outboard end at one vehicle door with one of the pair of inflatable devices at the first outboard end, a second outboard end at the other vehicle door with the other of the pair of inflatable devices at the second outboard end, and a front edge extending from one outboard end to the other outboard end, the third inflatable device when in the inflated position extending along the front edge between the first outboard end and the second outboard end of the seat bottom.

8. The assembly of claim 5, wherein the pair of inflatable devices are each elongated in a vehicle-longitudinal direction.

9. The assembly of claim 1, wherein the seat bottom defines an occupant pelvic area adjacent each of the inflatable devices, the inflatable devices being between the vehicle doors and the occupant pelvic area in the inflated positions.

10. The assembly of claim 1, wherein the inflatable devices are inflatable upwardly from the vehicle floor toward the inflated positions.

11. The assembly of claim 1, wherein the inflatable devices abut the seat bottom in the inflated positions.

12. The assembly of claim 1, wherein the inflatable devices are vehicle-outboard of the seat bottom.

13. The assembly of claim 1, wherein the inflatable devices abut the vehicle doors adjacent the inflatable devices, respectively.

14. The assembly of claim 1, further comprising a third inflatable device that is a thermoplastic elastomer, the third inflatable device being spaced from and inflatable to an inflated position between the inflatable devices.

15. The assembly of claim 14, wherein the seat bottom is movable upwardly from the vehicle floor by the third inflatable device as the third inflatable device moves to the inflated position.

16. The assembly of claim 14, wherein the third inflatable device is between the seat bottom and the vehicle floor.

17. The assembly of claim 14, wherein the pair of inflatable devices are vehicle-outboard of the third inflatable device.

18. The assembly of claim 1, wherein the inflatable devices are adhered to the vehicle floor.

19. The assembly of claim 1, further comprising an inflator fluidly connected to both of the inflatable devices.

20. An assembly comprising:

a vehicle floor;

a pair of vehicle doors spaced cross-vehicle from each other, the vehicle floor being between the vehicle doors;

a vehicle seat between the vehicle doors and having a seat bottom supported by the vehicle floor;

a pair of inflatable devices being thermoplastic elastomer and inflatable to inflated positions, the pair of inflatable devices being supported by the vehicle floor and spaced from each other, one of the inflatable devices being between the seat bottom and one of the vehicle doors in the inflated positions and the other of the inflatable devices being between the seat bottom and the other of the vehicle doors in the inflated positions, the seat bottom being elongated from one of the inflatable devices to the other of the inflatable devices; and a third inflatable device that is a thermoplastic elastomer, the third inflatable device being spaced from and inflatable to an inflated position between the inflatable devices.

* * * * *